July 20, 1965   N. M. ROBINSON   3,195,710
EQUIPMENT FOR ARRANGING PACKAGES
Filed July 9, 1963   5 Sheets-Sheet 1
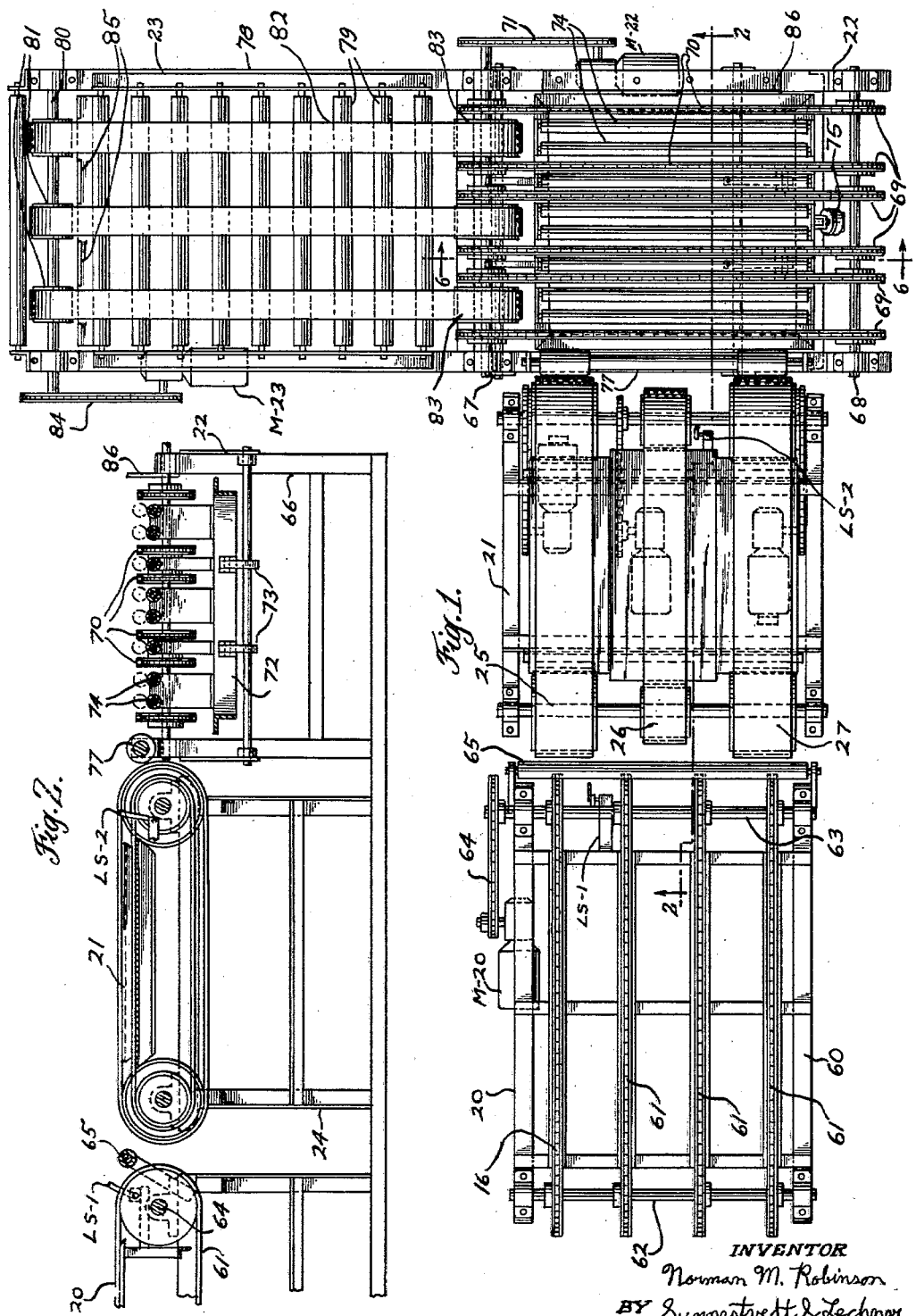

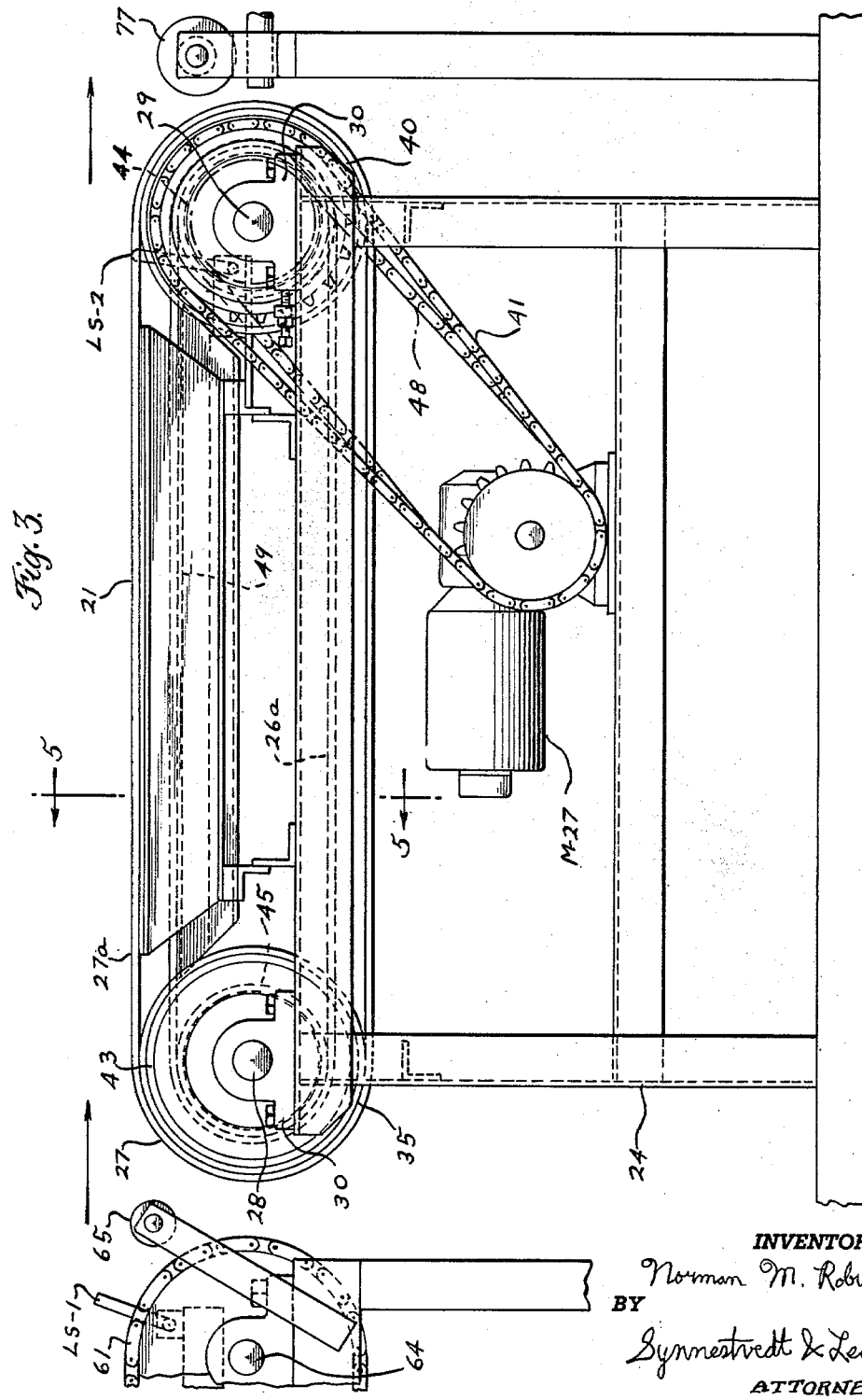

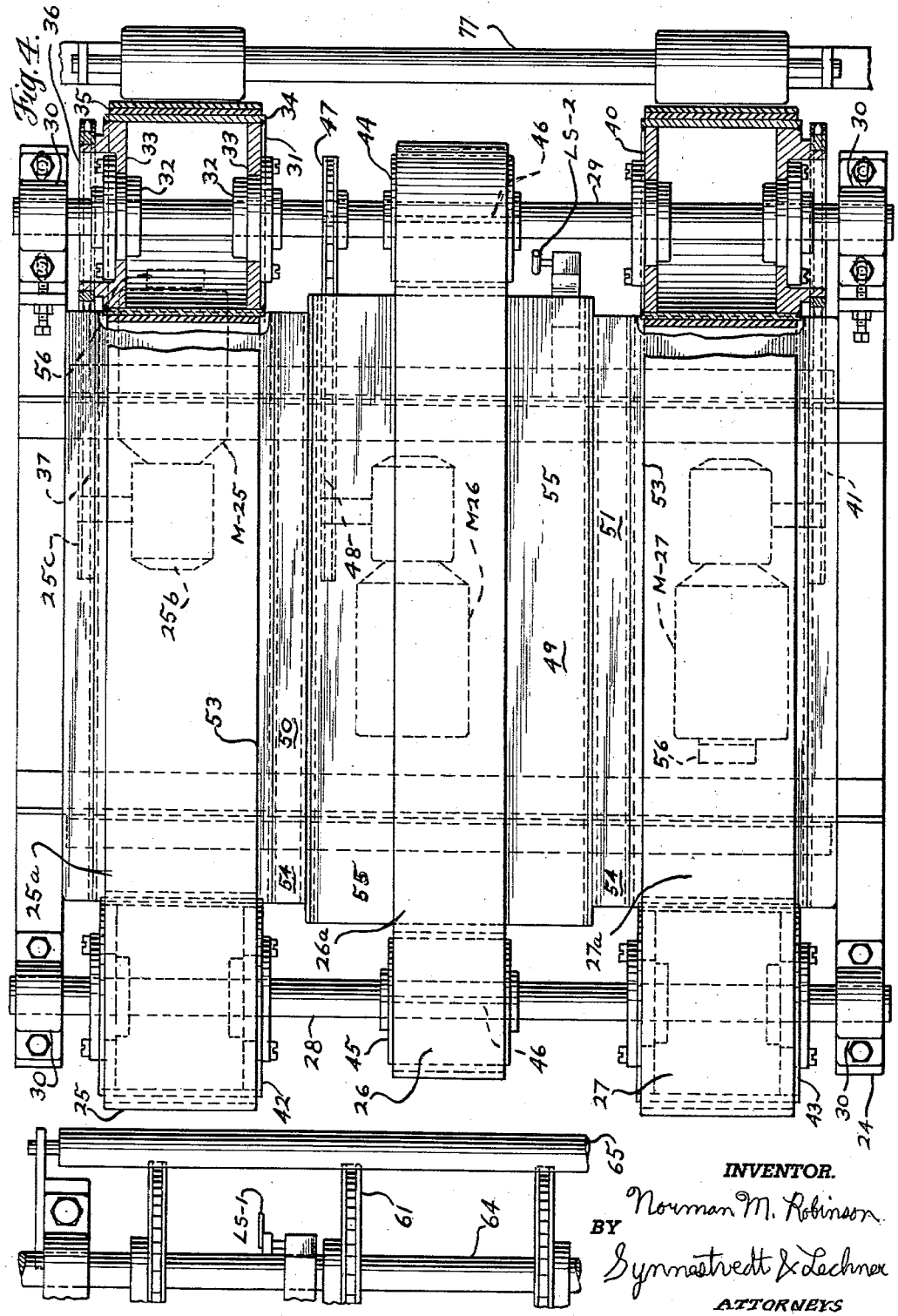

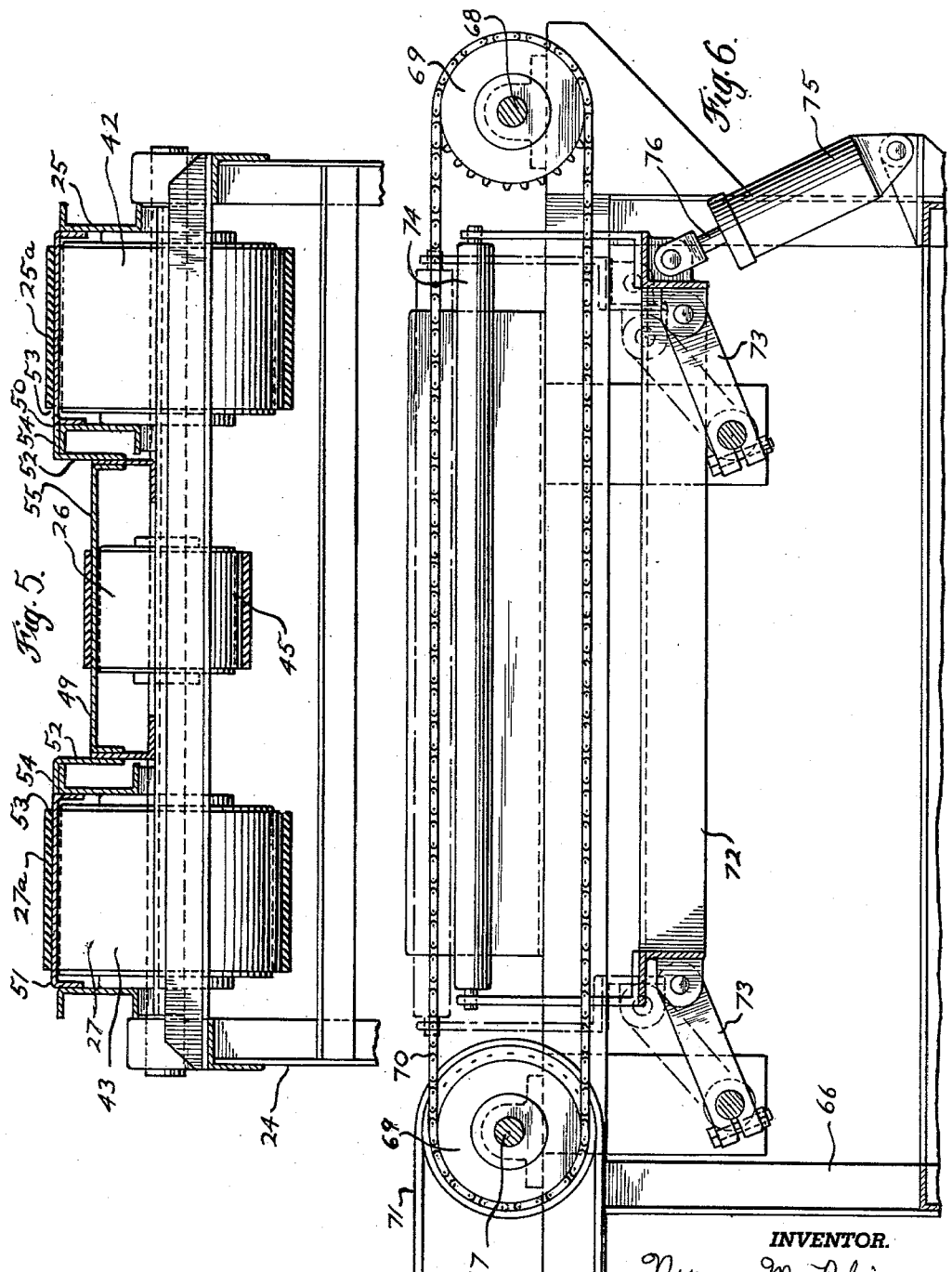

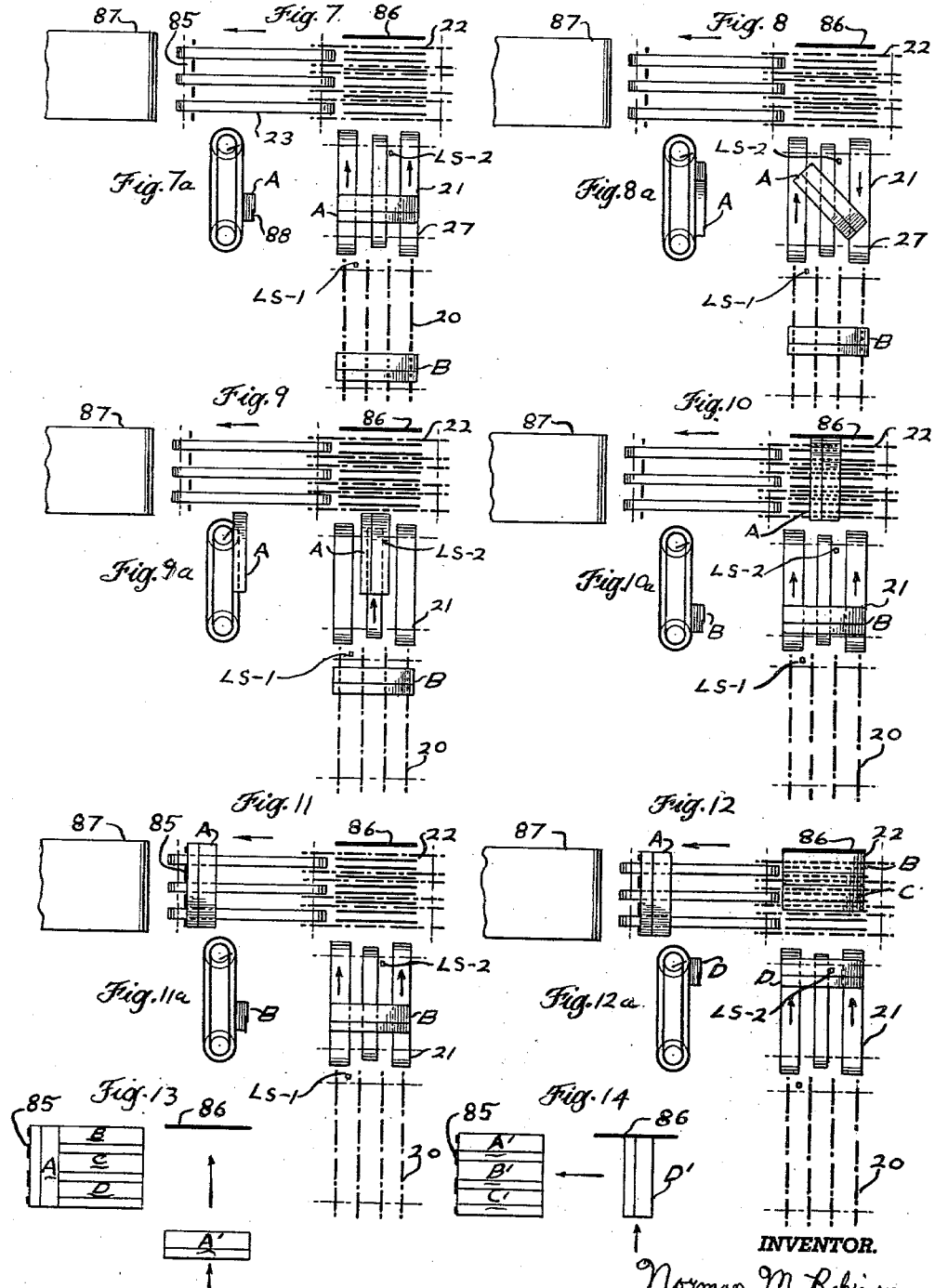

United States Patent Office 3,195,710
Patented July 20, 1965

3,195,710
EQUIPMENT FOR ARRANGING PACKAGES
Norman M. Robinson, Coatesville, Pa., assignor to Certain-Teed Products Corporation, Ardmore, Pa., a corporation of Maryland
Filed July 9, 1963, Ser. No. 293,681
7 Claims. (Cl. 198—33)

This invention relates to apparatus for arranging packages of substantially uniform size into groups or layers having a predetermined pattern. In practice, the group or layer so formed is often subjected to further handling as a unit. For example, a number of such layers are often stacked on a pallet by palletizing equipment.

The term "package" is used herein in a broad sense, and is not intended to indicate a limitation concerning the types of items which may be successfully handled by the equipment of the invention. In fact, the invention and many features thereof are useful with a wide variety of items which are generally rectangular in shape, in the sense that one axis is longer than the other.

In modern warehouse practice, it is common to arrange articles, such as packages, into groups for handling by mechanized equipment, such as fork-lift trucks. One type of grouping which is popular is the stack, which is often formed on pallets. Experience has shown that in order to form a stable stack, it is useful to arrange the packages forming the individual layers of the stack in predetermined patterns which are varied from layer to layer.

Heretofore, most of the manipulation required to form such layers has been performed by hand. In recent times, mechanized equipment has been devised to form the patterned layers, and to place them on pallets. However, much of this equipment is less than completely satisfactory, especially for applications where the packages are quite heavy.

Generally speaking, this invention has for an object the provision of improved equipment for handling packages, especially for handling packages with a view to organizing them into predetermined patterns.

It is an object of this invention to provide package arranging equipment suitable for use with heavy packages.

Another object of the present invention is to provide a simple and effective package turning device capable of turning generally rectangular packages substantially 90°.

A further object of the invention is the provision of a package turning apparatus which may be readily integrated with a conveyor system.

Still another object of this invention is the provision of package arranging equipment which is simple in construction and reliable in operation.

The above objects and purposes together with other objects and purposes may be more readily understood by a consideration of the detailed description which follows together with the accompanying drawings in which:

FIGURE 1 is a plan view of a preferred embodiment of the package arranging equipment of the invention;

FIGURE 2 is a sectional elevational view taken on line 2—2 of FIGURE 1;

FIGURE 3 is an enlarged elevational view of a package turning device forming a part of the apparatus shown in FIGURE 1;

FIGURE 4 is a plan view of the package turning device shown in FIGURE 3, with a portion of the right-hand end of the equipment shown in section;

FIGURE 5 is a cross sectional elevational view taken on the line 5—5 of FIGURE 3;

FIGURE 6 is an enlarged longitudinal section of the first accumulating table of FIGURE 1, the section being taken on line 6—6 of that figure;

FIGURES 7 through 12 are simplified diagrammatic plan views showing sequentially certain stages in the formation of a patterned layer;

FIGURES 7a through 12a are projected side views of the turning device shown in the correspondingly numbered plan views; and FIGURES 13 and 14 are diagrammatic plan views showing additional stages in the formation of patterned layers.

FIGURE 1 shows the over-all arrangement of the equipment of the preferred embodiment. The major sections include the feed mechanism 20, the turning device 21, the first accumulating table 22 and the second accumulating table 23. Packages to be oriented enter the equipment at the left in FIGURE 1, and completed patterned layers leave the equipment at the right-hand top of FIGURE 1. The feed mechanism 20 serves as an input station for the turning device 21. Similarly, the first accumulating table 22 serves as an output station for the turning device 21.

As will be discussed later in connection with FIGURES 7 through 14, in the formation of a patterned layer, certain packages of a series initially uniformly oriented, must be turned substantially at right angles. For this reason the turning device 21 is an important part of the invention, and is considered in detail first.

The turning device 21 is shown in FIGURES 1 and 2, and on an enlarged scale in FIGURES 3, 4 and 5. From these views it can be seen that the device is mounted on base 24. It includes three belt-type conveyors 25, 26, and 27. These conveyors are carried on shafts 28 and 29 which in turn are journalled into bearings 30 mounted on the base 24. Each conveyor has an endless belt, the belt for conveyor 25 being marked 25a, that for conveyor 26 being designated 26a, and that for conveyor 27 being designated 27a. Each of the endless belts runs around a pair of pulleys, one of which is mounted on shaft 28 and the other on shaft 29. In FIGURE 4 the construction of the pulleys is shown in some detail. The right-hand pulley for conveyor 25 is designated 31, and it can be seen that it consists of a pair of bearings 32 which turn freely on shaft 29, to which are attached a pair of end plates 33, and a drum 34 mounted on and serving to separate the two end plates. The surface of the drum is preferably covered with a high friction material as at 35 so that the pulleys grip the belts more effectively. Attached to one of the pulley end plates 33 is a sprocket 36. Thus the conveyor 25 is driven by a chain drive 37 which connects the drive motor M-25 through its gear box 25b and drive pulley 25c with the sprocket. The normal direction of drive is such that the belt 25a moves to the right in FIGURE 4 on the upper run thereof.

The right-hand pulley 40 for the conveyor 27, as shown in FIGURE 4, is substantially similar in construction to the pulley 31 which has just been discussed. Conveyor 27 is driven in a similar manner by motor M-27 through chain drive 41 and pulley 40. The normal direction of drive is such that the upper run of belt 27a moves to the right in FIGURE 4.

The left-hand pulley 42 of conveyor 25 and the left-hand pulley 43 of conveyor 27 are substantially similar to the pulleys 31 and 40 discussed earlier, except that they are not equipped with sprockets. It should be noted that all four of the pulleys discussed thus far are free to rotate about the shafts on which they are mounted.

The inner conveyor 26 differs in some respects from the outer or outboard conveyors just discussed. The pulleys 44 and 45, while they are similar in construction to the pulleys discussed above, are somewhat smaller in diameter. As a result, the conveyor 26, although it is mounted on the same shafts as the two outboard conveyors, has its upper run at a level lower than the level of the upper runs of the two outer conveyors 25 and 27.

The pulleys 44 and 45 are keyed to the shafts 29 and 28 respectively by means of the keys 46. A sprocket wheel 47 is keyed to shaft 29. Chain drive 48 connects motor M–26 to the conveyor 26 through sprocket 47 and shaft 29. Motor M–26 operates to move the belt 26a toward the right on the upper run of the conveyor.

As can be seen most clearly in FIGURES 4 and 5, supporting surfaces are provided for the upper runs of the three conveyors. Inasmuch as inboard conveyor 26 has its upper run depressed with respect to those of the outboard conveyors, the supporting surface 49 is positioned below the supporting surfaces 50 and 51 of the outboard conveyors 25 and 27. The inner supporting surface is connected with the outer supporting surfaces by means of the vertical walls 52 and hence the lower supporting surface 49 taken together with the vertical walls 52 may be considered a trough, and the outboard supporting surfaces 50 and 51 may be considered shoulders of the trough.

The proportions and relative positions of the various pieces of equipment discussed thus far should be noted. The principle of operation of the turning device, which gives rise to these considerations, may be understood by a study of FIGURES 7, 8 and 9. From these figures it will be seen that a rectangular package, as it enters the turning device, is supported on the two outboard belts, and has its longitudinal axis oriented substantially at right angles to the direction of movement. This situation is shown in FIGURE 7. If conditions require that no turning operation be performed on the particular package which is being carried by the outer conveyors, these two conveyors continue to move at substantially the same speed to carry the package to the output station without functionally modifying its orientation.

If, however, conditions require that the package carried by the outer conveyors be turned 90°, a substantial difference in the relative speeds of the two outboard belts is established and maintained for a short time, during which the package is caused to turn. After the turn is completed, the difference in relative speeds is eliminated, and the outboard belts are again moved at the same speed. The difference in relative speeds between the outer belts may be established in several ways. For example, while the speed of one belt is held constant, that of the other outer belt may be increased or decreased, or the belt may be brought to a stop or reversed. As another example, the relative speed differential may be created by altering the speed of both of the belts, as by speeding up one, and slowing down the other. In the preferred embodiment, one of the conveyors, for example the right-hand conveyor in FIGURE 8, is reversed. That is to say, its upper run now moves in a direction away from the output station, and in a direction opposite to that of its normal movement. The package carried by the outer conveyors thus has a turning moment applied to it, and as a result begins to rotate as shown in FIGURE 8. Ultimately the package is turned sufficiently far so that it drops off both of the outboard belts, and falls onto the inboard belt, which carries it to the output station. This stage in the turning operation is shown in FIGURE 9.

From this discussion, it can be seen that the alternate ways of establishing a relative speed differential will accomplish the same result as that which is brought about by the preferred belt-reversing construction disclosed. The system of reversing the direction of movement of one of the belts is preferred because of its simplicity because the speed changing means consists merely of a reversing switch for the motor. In the discussion which follows attention will be concentrated on the preferred embodiment using reversal of belt movement. However, it should be kept in mind that the other systems may be employed, and that the term "reversal" in this discussion is to be so interpreted.

Returning now to a consideration of the desirable proportions and arrangements, it can be seen that, in view of the mode of operation discussed above, the inner margins 53 of the outer belts 25a and 27a should be spaced apart a distance less than the length of the package to be handled. The inner margins 53 of the belts 25a and 27a should also be spaced apart a distance at least equal to the width of a package to be handled and preferably slightly more as in the embodiment illustrated.

Each of the support surfaces 49, 50 and 51 preferably extends under the full width of the belt which it is supporting and, in the embodiment shown in the drawings, they extend to a somewhat greater width than their belts. In this way, there is created a marginal region 54 on the inboard side of the two upper support surfaces 50 and 51. Similarly, a marginal region 55 is formed on either side of the inner belt 26a. The arrangement just described has been found to materially reduce the wear on the edges of the belts, and to reduce the danger of damaging packages during the course of transfer from the outer belts to the inner belt.

The supporting surfaces and the vertical walls 52 are preferably arranged so that the trough formed by these parts is approximately the same width as that of a package being handled. Thus the walls 52 serve as alignment guides, and assist in assuring that a package on the lower belt, which has been turned, is properly aligned when it is delivered to the output station.

The outer belts are most conveniently positioned so that they are at the same level. The inner belt should be positioned far enough below the outer belts that there will be no contact between it and the bottom of a package supported by the outer belts even though that package may sag somewhat in the middle. The pulley sizes, drive trains, and power sources for the two outer belts should be arranged so that the two belts are driven at substantially the same speed when they are moving in the same direction. At least one of the outer belts is provided with selectively operable means for reversing the direction of movement of the belt, or for otherwise creating a difference in speed between the two outer belts. In the embodiment shown in the drawings, the motors M–25 and M–27 for both of the outer belts are equipped with reversing switches 56. In this way, provision is made for either clockwise turning of the packages as shown in FIGURE 8, or counterclockwise turning. The speed of the inner belt need not be the same as the speed of the two outer belts, although it is preferred that it be approximately the same as the outer belt speed.

The speeds selected are related to the size of the package being handled, and the desired throughput rate. A relatively high outer belt speed is desirable for a high throughput, but the higher the outer belt speed, the more important it is to have equipment with a rapid reversing capability for changing the direction of movement of one of the belts. Relatively high belt speeds also enhance the performance of the equipment by making it more positive or snappier. A further consideration to be kept in mind is that in some instances the turning mechanism will be delivering both turned and unturned packages to an output station having a conveyor system which is unpowered. If this is the case, the turning mechanism should supply sufficient velocity to the packages being delivered to the output station so that they will have enough momentum to coast to the next powered section of the conveyor system, or to the backstop of the next section, as the case may be. In the equipment shown in FIGURE 1, the roller bed of the first accumulating table 22 is in fact unpowered.

By way of illustration, the unit shown in the drawings is equipped with outer belts normally moving at a linear velocity of about 350 feet per minute.

As mentioned previously, the feed mechanism 20 and the accumulating tables 22 and 23 cooperate with the turning mechanism. The feed mechanism 20 is provided with a frame on which are mounted four parallel chain conveyors 61. These are mounted on pulleys which share common shafts 62 and 63. The chain conveyors are powered by motor M–20 through chain drive 64. The gap between the feed mechanism 20 and the turning device 21 is partly filled by the roller 65 which is mounted on the feed mechanism and cantilevered into the gap between the units. The packages move across the feeding mechanism from left to right in FIGURE 1 with their long axes generally perpendicular to the direction of movement.

The first accumulating table 22 appears in plan view in FIGURE 1 and in elevation in FIGURES 2 and 6. As can be seen from these drawings, the first table is provided with a frame 66. On the frame are mounted shafts 67 and 68 on which are mounted a series of sprockets 69 carrying the chain conveyors 70. It should be noted that the chain conveyors 70 are spaced apart, and are arranged to run substantially at right angles to the direction of movement of packages coming onto the first accumulating table from the turning mechanism. The chain conveyors are driven by motor M–22 through chain drive 71. In the embodiment shown in the drawings, the motor drives the upper run of the chains to the left in FIGURE 6 and toward the top of FIGURE 1.

The frame 66 has pivotally mounted on it a sub frame 72. The pivotal mounting is accomplished by means of the short links 73. The sub frame 72 carries a series of rollers 74 in the spaces between the chains. The rollers are oriented with their axes parallel to the chains, and thus the set of rollers taken together establish a surface on which a package can move in a direction transverse to the direction of movement of the chains.

The sub frame is pivoted from an up position to a down position by means of the cylinder 75, which is mounted on the frame 66, and the piston (in the cylinder) whose piston rod 76 is pivotally mounted on the sub frame 72. The up position of the frame and the rollers carried thereby is indicated in dot and dash lines in FIGURES 2 and 6. From these figures it can be seen that when the set of rollers is raised up, the surface they establish is above the level of the chain conveyors. When the rollers are in the down position, the surface they establish lies below the level of the chain conveyors.

A transition roller 77 is mounted at the edge of the first accumulating table nearest the turning device to help fill the gap between the turning device and the rollers and the first accumulating table. As can be seen in FIGURE 1, this roller is of large diameter in the region opposite the outboard belts, and of smaller diameter in the region opposite the inboard belt.

In general, when a package is to be delivered to the first accumulating table, the rollers are placed in their up position, and the package moves from the turning device onto the rollers. When conditions require that the package then be moved to the second accumulating table, the rollers are lowered, thus placing the package on the chain conveyors which carry it to the left in FIGURE 6 and toward the top of FIGURE 1.

The second accumulating table 23 appears in FIGURE 1 where it can be seen that it is provided with a frame 78 carrying supporting rollers 79. At one end of the frame is mounted shaft 80 which carries pulleys 81 for the belt conveyors 82. The pulleys 83 for the other end of the belt conveyors are mounted on shaft 67 of the first accumulating table. The belt conveyors 82 are driven through chain drive 84 by motor M–23.

The frame 78 also carries a pivotal gate 85 which is pivoted by cylinder and pistton means mounted under the roller bed, but not shown in the drawings. The gate pivots between a position where is is projecting above the roller bed, to a position where it lies entirely beneath the surface of the roller bed.

The over-all arrangement of the equipment may best be seen by considering FIGURE 1. As shown in that figure, the feed mechanism 20 is positioned to receive packages from the left, and to convey them sequentially to the turning device 21 on the right. The packages moving across the feed mechanism have their longitudinal axes at right angles to the direction of movement. Each package as it moves across the right-hand end of the feed mechanism depresses the arm of switch LS–1. LS–1 is wired into a control system, including a stepping switch, for programming the operation of the equipment. If the stepping switch is at a position corresponding to an operation in the program involving the turning of a package, the operation of switch LS–1 causes, after a preselected time delay, the reversal of one of the outer belts of the turning mechanism. After a further preselected time delay, the motor is reversed once again, and the belt resumes its normal movement. The time delays just mentioned are achieved by means of standard timing devices in the control circuit. LS–1 performs certain other functions which will be discussed later herein.

The packages move across the turning device sequentially, and certain of them are turned in the manner discussed heretofore. The turning device passes the packages onto the rollers of the first accumulating table 22. The packages are held in their movement to the right by the backstop 86 of said table. As the packages move past the right-hand end of the turning mechanism, they depress the arm of switch LS–2.

Switch LS–2 is wired into the control circuit in a manner to assure that the rollers of the first accumulating table are in the up position immediately after a package has operated switch LS–2.

Switch LS–1, in addition to directing the operation of the turning device, directs, in conjunction with the stepping switch, the up and down movement of the rollers of the first accumulating table. If the operating conditions require that the first accumulating table be cleared of the package or packages on it while the next package is being turned, operation of LS–1 causes a solenoid operated valve associated with pneumatic cylinder 75 to admit air to force the piston into the cylinder, and thus lower the roller bed. If no clearing of the first accumulating table is required, this operation is omitted. When lowered, the roller bed is again raised by pneumatic pressure in the cylinder 75, to its up position upon operation of switch LS–2.

From the foregoing it can be seen that it is preferred that the cylinder 75, and its associated valve be fast acting in both the up and down directions, and that the chains 70 be driven at a fairly high speed so that they will clear from the first accumulating table any packages located thereon while the next package in the sequence is being turned.

The packages moved by the chain 70 from the first accumulating table are delivered to the second accumulating table where the belt conveyors move them generally toward the top in FIGURE 1. Ultimately the packages are brought to rest against the pivotally mounted gate 85. The packages remain in this position until further packages are delivered from the first accumulating table to the second in order to make up a complete patterned layer. When such a layer is complete, the pivotal gate 85 is lowered upon a signal from the control system and the layer is passed from the second accumulating table to a conveyor forming a part of the palletizing equipment. Such a conveyor is illustrated diagrammatically at 87 in FIGURES 7 through 12.

Attention is now directed to the series of diagrammatic plan views in FIGURES 7 through 12, 13 and 14, and the diagrammatic elevational views in FIGURES 7a through 12a. These views illustrate several steps in the formation of a patterned layer with the equipment of the present invention. For purpose of simplicity, only the major pieces of equipment are indicated by reference numbers in these drawings.

The operation illustrated in these figures involves the formation of a patterned layer of packages which are wrapped bundles of roofing shingles. The roofing shingles are wrapped with heavy paper in a package machine located farther up the assembly line from the present equipment. The nature of the wrapping operation is such that a glued overlap seam is formed on one side of the package. Such a seam in exaggerated form is shown at 88 on the package A in FIGURE 7a. The further handling of the packages after they are formed into a layer, for example the placement of the layer on a stack of similar layers, may make it desirable to give the packages a predetermined orientation in the layer with respect to the direction in which the lapped edge of the wrapping paper faces. If some care is not taken in this regard, there is a danger that the wrapping may be torn off the package. In order to obtain the desired orientation, with a given package orientation input, the turning device is operated to turn the package clockwise or counterclockwise as conditions may require. The situation illustrated in the drawings is one where the overlap faces toward the bottom of FIGURE 7, and the desired orientation when the package has been turned, for example as shown in FIGURE 11, is with the overlap facing to the left. In order to accomplish this, the right-hand conveyor 27 is the one which is reversed, so the package turns clockwise.

The patterned layer being formed in this sequence of views is shown in finished form in FIGURE 13 where it can be seen that it consists of three packages arranged side by side (B, C, and D) and one package (A) placed at right angles across the end of the three packages.

In FIGURE 7 package A has just come onto the turning device, and package B is behind it on the feed mechanism. Package A must be turned, so the control equipment causes belt 27 to reverse its direction a predetermined time after the arrival of package A on the turning device. Package A thus begins to rotate in a clockwise direction as shown in FIGURE 8. Ultimately it rotates approximately 90° and falls down onto the middle belt of the turning device. As appears in FIGURE 9, when this has happened, package B is near the end of the feed mechanism and is approaching the turning device. Package A is passed from the turning device onto the rollers of the accumulating table 22, where it is stopped by the backstop 86 as shown in FIGURE 10. Package B, as shown in FIGURE 10, has moved onto the turning device.

Conditions require that package B not be turned, and that package A be moved from the first accumulating table to the second. Therefore, the right-hand belt of the turning mechanism is *not* reversed, and the roller bed *is* dropped to allow the chains to move package A to the left. Package A ultimately comes to a stop against the gate 85. The situation just described is shown in FIGURE 11.

In FIGURE 12 package B is shown after it has crossed the turning device with unaltered orientation, and come to a rest against backstop 86. The succeeding package, C, is shown next to B, after it has similarly crossed the turning device with unaltered orientation. Package D is shown moving across the turning device without being turned. When package D comes into position on the first accumulating table next to package C, the rollers will drop, and the chains will move the entire group of packages (B, C, and D) onto the second accumulating table.

The accumulated layer so formed is shown against the gate 85 of the second accumulating table in FIGURE 13. In that figure the first package A' of the next patterned layer is shown crossing the turning device.

The completed layer shown in FIGURE 13 moves off the second accumulating table 23 onto the conveyor 87 when the gate 85 is lowered. The gate 85 is raised again by direction from the control system and the formation of a new layer consisting of packages A', B', C', and D' is begun. In this layer it is desired to have three packages lined up side by side and the fourth package at right agles across the right-hand end. FIGURE 14 shows one of the later stages in the formation of the second layer. In that figure it can be seen that packages A', B', and C' are in position against the gate 85 on the second accumulating table. All three of these packages crossed the turning device without being turned, and they were cleared as a unit from the first accumulating table to the second. Package D' was turned 90° as it crossed the turning device and is shown on the first accumulating table ready to be cleared therefrom and positioned against the other three packages to form the second complete layer.

The foregoing description of a typical operating procedure should make clear some of the capabilities of the package handling equipment of this invention. Those skilled in the art will be able to devise other modes of operating the equipment to take advantage of various features thereof.

I claim:

1. A mechanism for selectively orienting packages comprising three conveyors mounted in generally side by side relation, said conveyors being adapted to receive packages from an input station and to deliver them in desired orientation to an output station, the two outboard conveyors of said three conveyors having their package supporting surfaces, positioned at substantially the same level, said outboard conveyors being spaced apart a distance greater than the width of a package to be oriented and less than the length of such a package, the inboard conveyor of said three conveyors having its package supporting surface positioned at a level lower than that of the other conveyors, power means connected with each of said conveyors for normally moving the package supporting surfaces thereof toward said output station, including means for moving the package supporting surfaces of the outboard conveyors at substantially the same speed, and mechanism for selectively altering the relative speed of the package supporting surface of one of said outboard conveyors, with respect to the speed of the other outboard conveyor.

2. A mechanism for selectively turning packages comprising two elevated outboard conveyors normally driven in the same direction at the same speed, one of said conveyors being driveable at a different speed, said conveyors being spaced apart horizontally a distance less than the length of a package to be handled, and more than the width of a package, and an inboard depressed conveyor driven in the same direction as the normal drive of the outboard conveyors, said depressed conveyor being adapted to receive and transport packages in their reoriented position.

3. Apparatus for arranging generally rectangular packages into a layer made up of a plurality of packages positioned in a predetermined pattern comprising a package turning mechanism including a pair of spaced parallel conveyors normally driven in the same direction, one of said conveyors being selectively driveable at a different speed to apply a turning moment to packages carried by said conveyors, and a third parallel conveyor positioned between and below said spaced conveyors, said third conveyor being driven in the same direction as the normal drive of said spaced conveyors, said third conveyor being adapted to receive and transport turned packages, a feed mechanism positioned adjacent one end of said turning mechanism for sequentially delivering packages to the spaced conveyors of the turning mechanism with their long sides oriented transverse the direction of delivery, a first accumulating table positioned adjacent the other end of said turning mechanism for receiving both turned and unturned packages therefrom, said first accumulating having table drive means selectively engageable with packages thereon to convey them off said table to one side, and a second accumulating table positioned beside said first accumulating table for receiving packages therefrom.

4. A mechanism for selectively orienting packages comprising three belt conveyors mounted in generally side by side relation, said conveyors being adapted to receive packages from an input station and to deliver them in desired orientation to an output station, the two outer belts having their upper runs positioned at substantially the same level, said outer belts being spaced apart a distance greater than the width of a package to be oriented and less than the length of such a package, the inboard belt having its upper run positioned at a level lower than the level of the upper runs of the outboard belts, power means for driving said belts so that their upper runs move in the same direction, and mechanism for selectively reversing the direction of movement of one of said outboard belts.

5. A device for selectively orienting packages comprising three belt conveyors mounted in generally side by side relation, said conveyors being adapted to receive generally rectangular packages from an input station and to deliver them in desired orientation to an output station, the two outer belts having their upper runs positioned at substantially the same level, said outer belts being positioned with their inner margins spaced from each other a distance greater than the width of a package and less than the length of such a package, a generally horizontal support surface mounted beneath the upper run of each of said outer belts in supporting contact therewith, each of said support surfaces extending toward the other sufficiently far that they together define a gap between them slightly greater than the width of a package, the inner belt being mounted in said gap with its upper run positioned at a level lower than that of the upper runs of said outer belts, a generally horizontal support surface mounted beneath the upper run of the inner belt, in supporting contact therewith, generally vertical guide means at the inner side of each of the support surfaces of the outer belts extending toward the support surface of the inner belt, power means for driving said belts in the same direction at substantially the same speed, and means for selectively establishing a relative speed differential between the outer belts.

6. A device for selectively orienting packages adapted to receive generally rectangular packages presented with uniform orientation from an input station and to deliver said packages to an output station with one of two selected orientations, the first being the orientation as presented from the input station and the second being at substantially right angles to said first orientation, comprising a trough extending between said input station and said output station, said trough having a width slightly greater than the width of a package, a pair of shoulders, one positioned at each of the upper edges of said trough and running therealong, a belt conveyor positioned with its upper run supported by the floor of said trough, two additional belt conveyors, one positioned with its upper run supported by one of said shoulders and the other with its upper run supported by the other said shoulders, said additional conveyors being spaced apart a distance less than the length of a package, power means for normally driving all of said conveyors in the same direction and for driving the shoulder supported conveyors at substantially the same speed, and means for selectively establishing a relative speed differential between the speeds of the shoulder supported conveyors.

7. A mechanism for selectively orienting packages comprising three belt conveyors mounted in generally side by side relation, said conveyors being adapted to receive packages from an input station and to deliver them in desired orientation to an output station, the two outer belts having their upper runs positioned at substantially the same level, said outer belts being spaced apart a distance greater than the width of a package to be oriented and less than the length of such a package, the inboard belt having its upper run positioned at a level lower than the level of the upper runs of the outboard belts, power means for driving said belts so that their upper runs move in the same direction, and means for selectively establishing a relative speed differential between the outer belts.

References Cited by the Examiner

UNITED STATES PATENTS 586,866   7/97   Potter _____ 198—33

FOREIGN PATENTS 1,060,767   7/59   Germany.

SAMUEL F. COLEMAN, *Primary Examiner.*

WILLIAM B. LA BORDE, *Examiner.*

UNITED STATES PATENT OFFICE
CERTIFICATE OF CORRECTION

Patent No. 3,195,710                                                               July 20, 1965

Norman M. Robinson

It is hereby certified that error appears in the above numbered patent requiring correction and that the said Letters Patent should read as corrected below.

Column 5, line 66, for "pistton" read -- piston --; line 68, for "is is" read -- it is --; column 8, line 26, strike out the comma; line 71, after "accumulating" insert -- table --; line 72, strike out "table"; column 10, line 12, after "other" insert -- of --.

Signed and sealed this 22nd day of February 1966.

(SEAL)
Attest:

ERNEST W. SWIDER                                          EDWARD J. BRENNER
Attesting Officer                                              Commissioner of Patents